United States Patent Office 3,311,332
Patented Mar. 28, 1967

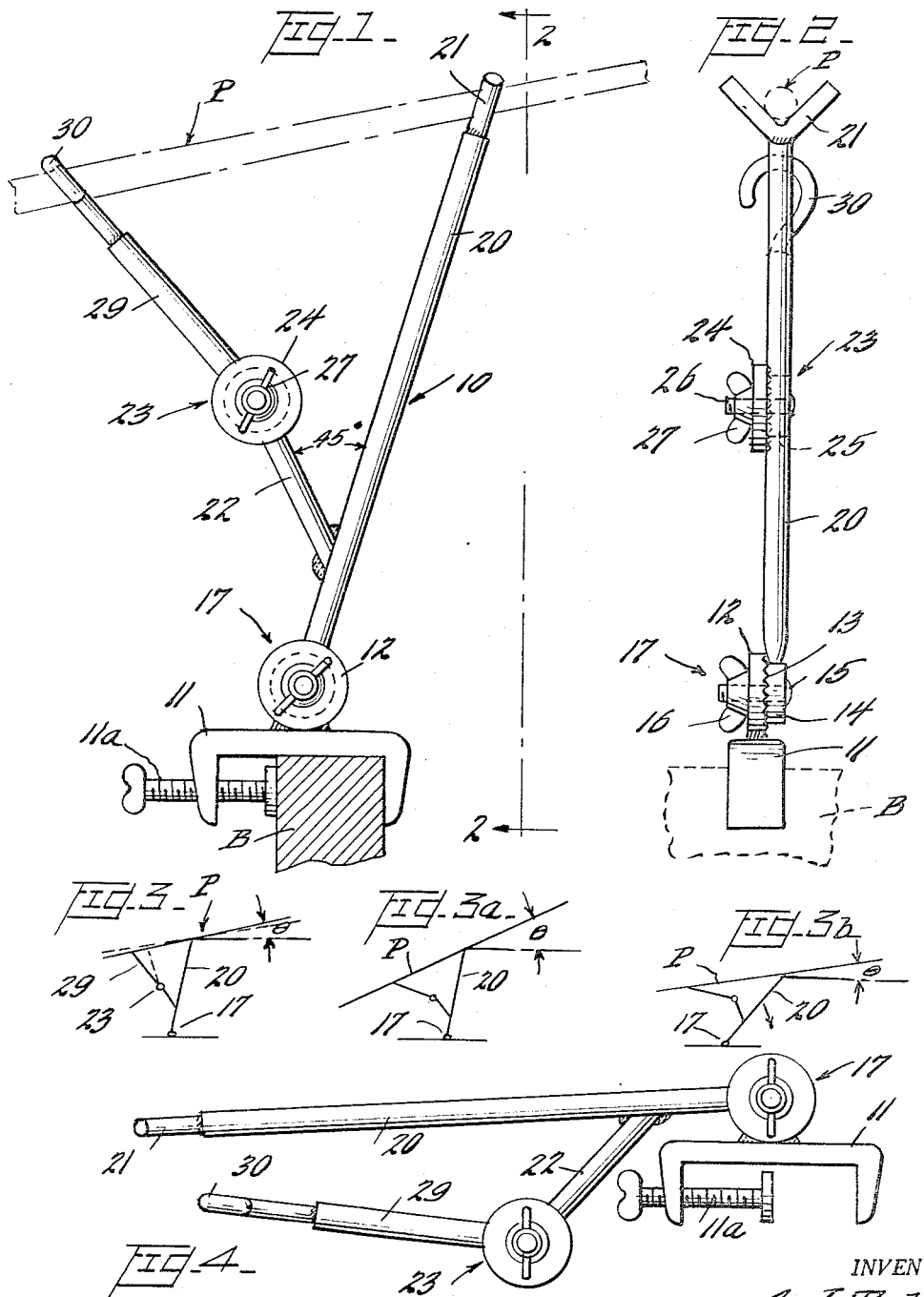

3,311,332
FOLDING HOLDER FOR FISHING POLE
Alphonse John Takus, 1834 Kem Road,
Marion, Ind. 46952
Filed Apr. 29, 1966, Ser. No. 546,424
5 Claims. (Cl. 248—42)

The present invention relates to fishing pole holders and, more particularly, to a holder for a pole which is adapted for easy adjustment of the angle of inclination of the pole.

In pole fishing, the pole utilized is exceptionally long so that the fishing line can be connected directly to the remote end of the pole and the fishing hook can be serviced without the use of a reel for the fishing line by simply raising the pole to a substantially vertical position. During use, the pole is ideally held at an acute angle of inclination to the surface of the water, which angle serves to determine the depth to which the bait is held in the water, but, as will be realized, this can become a tedious job. Furthermore, since such a pole is quite heavy, especially when it is extended to its full length, it becomes almost impossible for the fisherman to constantly hold the pole at the required angle of inclination for long periods of time.

Several prior art devices have been propooed for holding fishing rods at a desired angle to the surface of the water during use to relieve the fisherman of this task; however, insofar as I am aware, each of these devices is incapable of the type of selective adjustment through a relatively wide angle which is required in pole fishing to gain the proper angle of inclination, as indicated above. Further, each of the prior devices is constructed so as to extend in a generally horizontal direction for particular adaptation to a fishing rod and reel which causes the holder to extend a substantial distance over the side of the boat on which it is mounted to present an interference problem during handling of the boat in close quarters. To the contrary, the holder of the present invention extends upwardly in a generally vertical direction from its base member so as to cause a minimum amount of interference with the use of the boat.

Accordingly, it is one object of the present invention to provide a fishing pole holder which is adapted to securely hold a conventional pole at the desired angle of inclination to the water.

According to the preferred embodiment of the invention, there is provided an arrangement for substantial adjustment of the fishing pole holder so that the angle of inclination of the pole can be easily varied to a substantial extent. Furthermore, this adjustment is advantageously available through two separate adjusting means; one adjusting means being capable of coarse adjustment of the angle of inclination of the rod and the other adjusting means being capable of a fine adjustment of said angle of inclination.

In particular, the device of the invention comprises a base member, an upwardly extending main post, an arm extending rearwardly from said main post, and a cradle and hook on the remote ends of said post and said arm, respectively, for receiving and holding the pole in position. The above mentioned coarse adjustment is provided by pivotally mounting the main post about a horizontal axis on the base member and the fine adjustment is provided by pivotally mounting the hook on the rearwardly extending arm. Thus, when it is desired to effect a substantial adjustment in the angle of inclination, the pivotal joint at the base of the main post is loosened and both the forward cradle and the rearward hook are bodily rotated with respect to the pivotal axis to change the position of the pole being held thereby. If on the other hand the pole has been positioned substantially as desired by the coarse adjustment, the rearward hook may be rotatably adjusted alone about its pivotal axis to obtain the smaller amount of adjustment.

Another aspect of the present invention is that the device of the invention may be conveniently folded into a compact configuration for storage in a tackle box or the like by merely adjusting the pivotal joints as illustrated in the drawing. This means that the fishing pole holder can be conveniently stored in a tackle box, for example, without dismantling the various parts.

Thus, it is another object of the present invention to provide a fishing pole holder of the type described wherein the angle of inclination of the pole may be selected by two separate adjustments of varying effectiveness.

It is another object of the present invention to provide a fishing pole holder that may be clamped to the side of a boat and extends substantially in a vertical plane therefrom so as to not interfere with other boats or a dock when the boat is brought alongside the same.

It is still another object of the present invention to provide a fishing pole holder which extends in a generally upward direction and which is constructed so as to be balanced in normal positions of use.

It is still another object of the present invention to provide a fishing pole holder of simple and sturdy construction which is particularly adapted for securely holding telescoping poles of the type generally used for fishing in shallow water.

It is an additional object of the present invention to provide a fishing pole holder capable of adjustment and further capable of being folded into a compact package by the selective placement of the adjusting means.

It is still a further object of the present invention to provide a fishing pole holder in which the pole need not be placed in any particular position along its length so that the pole may be placed in and removed from the holder with ease.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawing and description are to be regarded as illustrative in nature, and not as restrictive.

In the drawing:

FIGURE 1 is a side view of the fishing pole holder constructed in accordance with the present invention showing the same mounted for use;

FIGURE 2 is an end view of the fishing pole holder looking in the direction indicated at line 2—2 of FIGURE 1;

FIGURES 3, 3a and 3b are schematic diagrams showing various adjusted positions of the holder of the invention with an associated pole; and FIGURE 4 is a view of the fishing pole holder shown in FIGURES 1 and 2 when folded in a compact package for storing.

Referring now to FIGURES 1 and 2 of the drawings, there is illustrated a fishing pole holder 10 constructed in accordance with the teachings of the persent invention and depicted in this figure with a conventional fishing pole P in the normal associated position. The holder 10 comprises a base member 11 which is or may be a conventional C-clamp with a clamping screw 11a for securing the holder 10 to a suitable support, such as a side of a boat B. Welded to the central portion of the base member 11 is a mounting ring 12 having one face thereof formed with serrations or teeth 13 (see FIGURE 2). Adapted to mate with the serrated face 13 of the mounting ring 12 is a washer 14 of smaller diameter than said mounting ring 12 and aligned along the same horizontal axis as said mounting ring 12 by a threaded shaft 15. A wing nut 16 is supplied on said threaded shaft 15 to clamp the washer 14 to the mounting ring 12 in a fixed angular relationship to thus complete adjustable joint 17 of the holder 10.

The washer 14 supports a radially extending main post 20 at the top of which is carried a forward V-shaped cradle 21 that opens in the upward direction and is adapted to receive the pole P at a point along its length, as well illustrated in FIGURE 1. An arm 22 is welded to the main post 20 at a position of about one-quarter of the length from the base of said main post 20, and this arm 22 carries a second adjustable joint 23 substantially identical to the adjustable joint 17 just described. Thus, as can be seen in FIGURE 2, a mounting ring 24 also also has a serrated or toothed face with which is associated a mating adjustable washer 25 and in combination with a threaded shaft 26 and a wing nut 27, these parts form the adjustable joint 23 which is capable of effecting adjustment of an upwardly extending elongated rod member 29, carried by said washer 25. As can be noted by viewing FIGURES 1 and 2, the rod member 29 includes an upper portion which forms an inverted hook 30 in an offset fashion (note FIGURE 2) so as to be in alignment with the open forward cradle 21 whereby the pole P can be conveniently placed in position on said open cradle 21 and then hooked at a rearward point under the inverted hook 30. As thus positioned, it will be realized that the pole P is securely held solely by the weight of the remote end of said pole P and due to the fact that the joints 17, 23 may be securely clamped by the wing nuts 16, 27 to prevent rotation of the parts about the horizontal axes and since there are no vertical pivots in the holder 10 that might allow displacement about a vertical axis, the pole P is retained in the desired position even during the action of outside forces on said pole P such as results in the case of a fish being caught.

It will be realized that the fishing pole holder 10 of the present invention is advantageously of a simple construction, and, for additional economy the main post 20, the arm 22, and the shank of the rod member 29 are fabricated from conventional pipe stock with the cradle 21 and the upper portion or hook 30 of the rod member 29 being formed of conventional bar stock. These parts are suitably welded into position as illustrated in these figures so that the fabrication costs are also held to a minimum.

It can be seen that the general configuration of the fishing pole holder 10 of the present invention extends in a generally upward direction so that the overhang to the sides of the boat B is held to a minimum, which means that the boat may be maneuvered without fear of catching the holder 10 on adjacent objects, such as another boat, a dock, etc. Also, it will be noted that the arm 22 is positioned at substantially a 45° angle from the main post 20 so that the overall configuration of the holder 10 is balanced about the horizontal shaft 15 which forms the main axis of said holder 10. This feature of balancing the holder 10 about the main axis is particularly important in aiding the user of the holder 10 in determining the normal adjusted position for use as shown in FIGURE 1.

It will be remembered that one of the main features of the device of the invention is that it is capable of adjustment by two separate means, namely, the adjustable joints 17, 23. To explain this feature, reference is made to FIGURES 3, 3a, and 3b, wherein the holder 10 with the associated pole P is shown in schematic diagrams with the angle of inclination of the pole P being indicated by the symbol $\theta$. Thus, in FIGURE 3, the normal position with a normal angle of inclination $\theta$ is illustrated in full lines (same as in FIGURE 1) and in the dotted lines an exemplary adjusted position of the pole P is illustrated, which position is gained by adjustment of the rod member 29 clockwise about the joint 23 to the dotted line position. Thus, this particular adjustment is used to effect a small angular change or a fine adjustment after the holder 10 has been brought into the general vicinity of the final adjusted position, as now to be described.

As shown in FIGURE 3a, the pole P may be, for example, adjusted to a much larger angle of inclination $\theta$ by simply adjusting the main post 20 in the counterclockwise direction about the adjustable joint 17. This coarse adjustment of the angle of inclination $\theta$ can be easily effected by simply grasping the pole and the holder 10 in the vicinity of the forward cradle 21 and, after loosening the wing nut 16, bringing the entire arrangement in the indicated counterclockwise direction and then tightening the wing nut 16 when the desired position is reached. As will be noted, this coarse adjustment is the result of the combination of the movement of both the cradle 21 and the hook 30 with respect to the adjustable joint 17. That is to say, as viewed in FIGURE 1 as the holder 10 is rotated counterclockwise the angle of inclination $\theta$ is not only affected by the vertical raising of the cradle 21 but is also affected by the vertical lowering of the rear hook 30 in such a manner that the adjustments are additive for the quick adjustment which is desired upon positioning the pole P in the initial position.

Conversely, when the entire fishing pole holder 10 is rotated about the adjustable joint 17 in the clockwise direction as illustrated in FIGURE 3b, the angle of inclination $\theta$ is quickly reduced to a smaller angle $\theta$ as desired. In either the case where the angle of inclination $\theta$ is increased (FIGURE 3a) or decreased (FIGURE 3b), the final fine adjustment can be effected as explained with relation to FIGURE 3 by movement of the rod member 29 carrying the hook 30 about the pivotal joint 23.

The manner in which the holder 10 is adjusted for easy storage in a tackle box or the like is well illustrated in FIGURE 4 in which it can be seen that said holder 10 folds into a compact package by merely a simple adjustment of the joints 17, 23. More particularly, when it is wished to store the holder 10 of the invention, the main post 20 is brought substantially parallel with the base member 11 and the rod member 29 is adjusted so as to be disposed adjacent the main post 20 in the manner shown in FIGURE 4. Thus, it will be realized that the storage can be accomplished without dismantling of the parts and as a result the holder 10 is always ready for immediate use.

Thus, it can be seen that while the construction of the fishing pole holder 10 is extremely simple, the same is adapted for adjustment in a novel and very useful manner and is capable of being stored by merely actuation of the adjustable joints 17, 23 that afford this adjustment. Further, it can be realized that the holder 10 is of such a construction to be capable of securely positioning the fishing pole P while at the same time leaving said pole P available for quick removal as desired.

In this disclosure, there is shown and described only the preferred embodiment of the invention, but, as aforementioned, it is to be understood that the invention is capable of various changes or modifications within the scope of the inventive concept as expressed by the accompanying claims.

I claim:
1. A fishing pole holder comprising the combination of a base member adapted to be fixed to a suitable support, an upstanding main post, means mounting said post for angular adjustment about a horizontal axis on said base member, a forward cradle member disposed at the upper end of said main post, an arm extending from said main post in a rearward direction, an elongated rod member, means mounting said rod member for angular adjustment about a horizontal axis at the end of said arm, said rod member extending in substantially the same rearward direction as said arm, and an inverted hook carried by the end of said rod member, whereby said fishing pole can be securely positioned between said cradle and said hook at a selected angle of inclination by angular adjustment of said main post and said rod member.

2. The combination of claim 1 wherein said arm extends from said post along the length thereof at an angle of approximately 45°.

3. The combination of claim 1 wherein both of said post mounting means and said rod member mounting means each includes a ring and threaded shaft positioned along the respective horizontal axis, said rings being fixed to the base member and the arm, respectively, a mating washer fixed to the post and the rod member, respectively, and means for clamping said washers against the respective rings for frictionally retaining the parts in adjusted position including a wing nut on said threaded shaft.

4. The combination of claim 3 wherein said rings and said washers have interlocking serrations to insure locking of the parts in response to actuation of said clamping means.

5. The combination of claim 1 wherein said cradle member is substantially V-shaped and said hook has a portion of one side open in all adjusted positions of said holder, whereby the removal of said pole from said holder is facilitated.

References Cited by the Examiner

UNITED STATES PATENTS

| | | | |
|---|---|---|---|
| 840,241 | 1/1907 | Nootbaar | 248—40 X |
| 1,025,657 | 5/1912 | Towne | 248—40 |
| 1,091,491 | 3/1914 | Ebur | 248—38 |
| 2,243,388 | 5/1941 | Magyarosi | 248—42 |
| 2,484,427 | 10/1949 | Schwenk | 248—42 |
| 2,492,323 | 12/1949 | Roell | 248—38 |
| 2,559,421 | 7/1951 | Garrett | 248—38 |
| 2,985,414 | 5/1961 | Ince | 248—42 |

CLAUDE A. LE ROY, *Primary Examiner.*